Patented Oct. 11, 1932

1,881,751

UNITED STATES PATENT OFFICE

FRANK LODGE AND WILLIAM WYNDHAM TATUM, OF MANCHESTER, ENGLAND, ASSIGNORS TO IMPERIAL CHEMICAL INDUSTRIES LIMITED, OF LONDON, ENGLAND

MANUFACTURE OF ANTHRAQUINONE DERIVATIVES

No Drawing. Original application filed August 29, 1929, Serial No. 384,796, and in Great Britain September 18, 1928. Divided and this application filed August 9, 1929. Serial No. 384,795.

The 2-alkoxy derivatives of 1:4-diaminoanthraquinones are important intermediates in the manufacture of dyes. Amino and diaminoanthraquinones are not usually used as dyes, but in British Patent No. 211,720 certain aminoanthraquinones and derivatives of the same are used to dye acetyl silks. The dyes used in the process of the patent are all insoluble in water and only very sparingly, if at all, even in strong acid solutions. When these dyes are applied to silk they must first be made into a colloidal solution or suspension.

As explained in our co-pending application Serial No. 384,796 of which this application is a division, we have found that 2-alkoxy derivatives of 1:4-diaminoanthraquinones including in this term the alkyl or aryl N-substituted derivatives of the same may be obtained with unexpected ease from 1:4-diaminoanthraquinones which contain a sulphonic group in position 2 by reacting such diaminoanthraquinone with alkali metal alkoxides. Under alkali metal alkoxides we understand the bodies which result when alkali metal is caused to react with an aliphatic alcohol or when an aliphatic alcohol is treated with a concentrated aqueous lye of an alkali metal hydroxide or when a solid alkali metal hydroxide is dissolved in an aliphatic alcohol. The alkoxide used may be derived from any of the lower aliphatic alcohols, such as methyl, ethyl, propyl, isopropyl, butyl, isobutyl, tertiary butyl, or any of the amyl alcohols; and any of those alcohols may be used with sodium or potassium hydroxide to effect the reaction.

Under the broad class of compounds produced by the above method there is a narrower class which may be represented by the following general formula

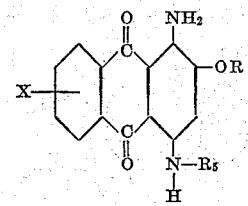

wherein R represents an alkyl group, $R_5$ represents a benzene residue capable of being sulphonated and X represents hydrogen or a sulphonic acid group.

According to the present invention we have found that the compounds of the above mentioned class having the indicated formula whether obtained by the mentioned process or otherwise may be readily sulphonated by treatment with sulphonating agents yielding valuable wool dyes whereby it is believed that the sulphonic group enters the aryl radical $R_5$. These dyes as free acids will accordingly have the general formula:

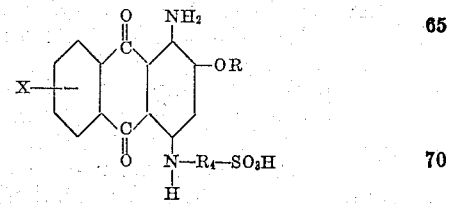

wherein R represents an alkyl group, $R_4$ represents a benzene residue and X represents hydrogen or a sulphonic acid group.

Our copending application is mainly directed to the processes of manufacturing those dyes which contain an amino or alkylamino group in the 4-position. It also is directed to processes of making the dyes which do not contain a sulphonic acid group in the anthraquinone nucleus. The present application is mainly directed to a complete process of making sulphonated 2-alkoxy derivatives of the starting compounds, which contain in the 4-position the group -N-$R_5$, wherein $R_5$ represents a benzene residue; this complete process being effected as a two-step process if desired.

Our invention is illustrated but not limited by the following examples:

Example 1

10 parts of 1-amino-2-methoxy-4-anilidoanthraquinone are dissolved in 50 parts of sulphuric acid monohydrate and sulphonated by running in 20 parts of 20% oleum at room temperature. The colour acid is isolated by pouring the whole onto ice and filtering off the precipitate which separates out. It is redissolved in dilute alkali, neutralized and salted out. The resultant product dyes wool in level reddish violet shades of excellent fastness to light and milling. In a similar manner 1-amino-2-methoxy-4-p-toluidoanthraquinone may be sulphonated. The resultant sulphonic acids are believed to contain a sulphonic group attached to the anilido or p-toluido residue. The dye obtained from the p-toluido body appears to be identical with the dye obtained according to Example 3 of the co-pending application Serial No. 384,796 of even date herewith.

Example 2

10 parts of 1-amino-4-toluidoanthraquinone-2:8-disulphonic acid are refluxed for six hours with 80 parts of methyl alcohol and 35 parts of caustic soda liquor 78° Tw. The product is filtered off, dried and sulphonated with 6 parts of 20% oleum at 20° C. The melt is poured on to ice, the resultant precipitate filtered off, redissolved in dilute alkali, neutralized and salted out. The disulphonate thus obtained is very soluble and dyes wool bluish violet.

Example 3.—Preparation of 1-amino-2-methoxy-4-anilidoanthraquinone 10 parts of 1-amino-4-anilidoanthraquinone-2-sulphonic acid are boiled with 100 parts of methyl alcohol and 20 parts of sodium methylate. After a short time the new compound is precipitated and is filtered off and washed with hot water. It forms a blue paste which dyes acetate rayon in violet shades. The colour in sulphuric acid is red, turning blue on addition of formaldehyde.

As an alternative method there may be used the following:

10 parts of 1-amino-4-anilidoanthraquinone-2-sulphonic acid are boiled for four hours with 200 parts of methyl alcohol and 60 parts of caustic soda liquor of 78° Tw. The product is worked up as above.

Example 4

10 parts of 1-amino-2-sulpho-4(-sulpho-p-toluido)-anthraquinone are refluxed with 50 parts of methyl alcohol and 9 parts of caustic soda for four hours. The new dye-stuff is filtered off and washed with a 2 per cent salt brine. It dyes wool in level violet shades which are fast to light and milling. This body appears to be the same product as that obtained in Example 1.

Example 5

10 parts of 1-amino-4-toluidoanthraquinone-2:8-disulphonic acid are refluxed for six hours with 80 parts of methyl alcohol and 35 parts of caustic soda liquor of 78° Tw. The product is filtered off and dried.

Example 6.—1-amino-2-ethoxy-4-toluidoanthraquinone 10 parts of 1-amino-4-toluidoanthraquinone-2-sulphonic acid are boiled for 1 hour with 80 parts of ethyl alcohol and 5 parts of caustic soda. The resultant purple crystals of 1-amino-2-ethoxy-4-p-toluidoanthraquinone are filtered off, washed with hot water and dried. The solution in sulphuric acid is red, becoming fluorescent on addition of boric acid and changing to blue on addition of formaldehyde.

Example 7.—1-amino-4-toluidoanthraquinone-2-butyl ether 10 parts of 1-amino-4-p-toluidoanthraquinone-2-sulphonic acid are stirred at 116° C. for one half hour with 100 parts of normal butyl alcohol and 10 parts of caustic soda. The amino-toluidoanthraquinone butyl ether is obtained in the form of violet crystals which are filtered off, washed and dried.

The corresponding anilido derivative is obtained in a similar manner from 1-amino-4-anilidoanthraquinone-2-sulphonic acid. Both these new bases give red colourations in sulphuric acid changing to blue on addition of formaldehyde.

What we claim and desire to secure by Letters Patent is:—

1. In a process of manufacturing dyestuffs having the probable formula

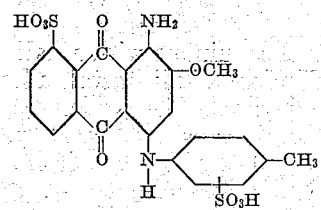

the process which comprises reacting a 1:4-diaminoanthraquinone having the probable formula

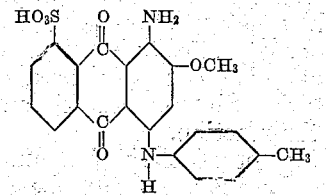

with oleum.

2. As a new dye, the 1:4-diaminoanthraquinone body having the probable formula

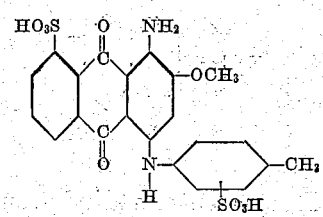

the said dye being a powder soluble in water and dyeing wool in bluish to violet shades, the said dye being obtainable by reacting a 1:4-diaminoanthraquinone having the probable formula

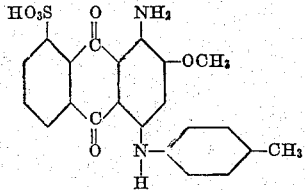

with oleum.

3. As new dyes, the 1:4-diaminoanthraquinone body having the probable formula

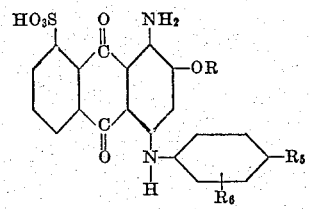

wherein R represents an alkyl group, $R_5$ represents hydrogen or an alkyl group and $R_6$ represents hydrogen or a sulphonic acid group, said dyes being powders soluble in water and dyeing wool in bluish to violet shades.

4. As new dyes, the 1:4-diaminoanthraquinone bodies having the probable formula

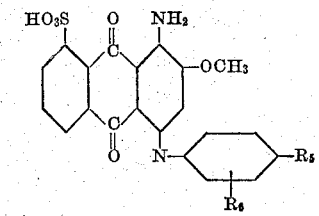

wherein $R_5$ represents hydrogen or a methyl group and $R_6$ represents hydrogen or a sulphonic acid group, the said dyes being powders soluble in water and dyeing wool in bluish to violet shades.

5. As new dyes the 1:4-diaminoanthraquinone bodies having the probable formula

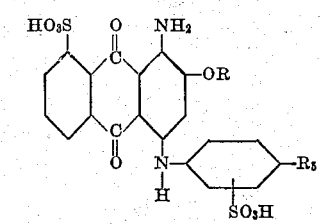

wherein R represents an alkyl group, $R_5$ represents hydrogen or an alkyl group, the said dyes being powders soluble in water and dyeing wool in bluish to violet shades.

6. As new dyes, the 1:4-diaminoanthraquinone bodies having the probable formula

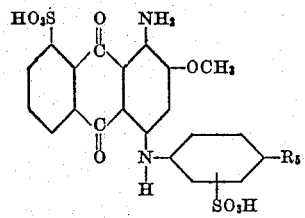

wherein $R_5$ represents hydrogen or a methyl group.

7. As a new dye, the 1:4-diaminoanthraquinone body having the probable formula

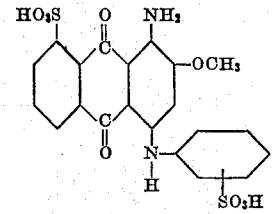

the said dye being a powder soluble in water.

8. As new dyes, the 1:4-diaminoanthraquinone bodies having the probable formula

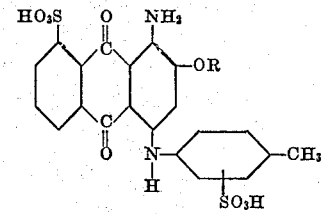

wherein R represents an alkyl group.

In testimony whereof we affix our signatures.

FRANK LODGE.
WILLIAM WYNDHAM TATUM.

CERTIFICATE OF CORRECTION.

Patent No. 1,881,751.  October 11, 1932.

FRANK LODGE ET AL.

It is hereby certified that error appears in the printed specification of the above numbered patent requiring correction as follows: Page 2, line 71, for "1-amino-4-toluidoanthra-"read 1 - amino -4-p-toluidoanthra -; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.